Figure 1:
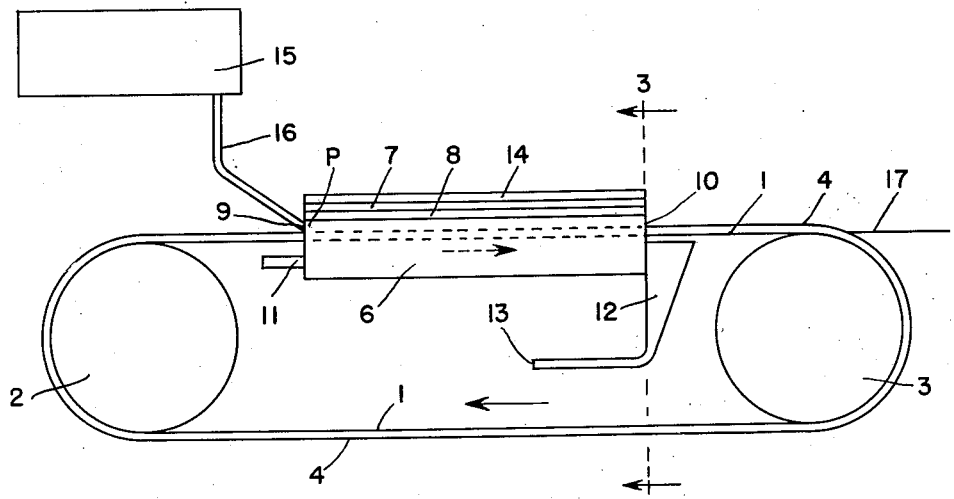

Dec. 18, 1951  A. BURNESS ET AL  2,579,138
PRODUCTION OF POLYMERIC MATERIALS IN SHEET FORM
Filed Jan. 13, 1949

Inventors
ALEXANDER BURNESS
EDMOND GEORGE WILLIAMS

*Cushman, Darby & Cushman*

Attorneys

UNITED STATES PATENT OFFICE 2,579,138

PRODUCTION OF POLYMERIC MATERIALS IN SHEET FORM

Alexander Burness, Welwyn Garden City, and Edmond George Williams, Lemsford, England, assignors to Imperial Chemical Industries Limited, a corporation of Great Britain Application January 13, 1949, Serial No. 70,702
In Great Britain January 21, 1948

15 Claims. (Cl. 18—57)

This invention relates to the production of polymeric materials, particularly sheets of polymeric materials.

Sheets of polymeric materials have previously been produced by casting compositions which contain compounds having the group $CH_2=C<$ in chambers having flat side walls composed of glass or metal, and subjecting these compositions to polymerising conditions. The side walls used in these chambers have had smooth or highly polished surfaces because any lack of smoothness or polish on these walls is reproduced on the surfaces of the sheets of polymerisation products produced in these chambers. Glass plates for use as these side walls have the advantages that they may be produced with very smooth flat surfaces, and that these surfaces are resistant to scratching. They suffer, however, from the disadvantage that they are easily broken. Metal plates are, on the other hand, robust, but metal surfaces of any size are only produced in a very smooth flat and highly polished state with great difficulty, and these surfaces are easily scratched.

The object of the present invention is to provide a method for the production of articles of polymeric materials having at least one smooth surface, this method being one which overcomes difficulties of the prior art. Another object is to provide such a process which is suited to the continuous production of sheet materials.

According to the present invention, these objects are accomplished by a process wherein a liquid or paste containing one or more compounds having the group $CH_2=C<$ is allowed to flow so that it forms a smooth upper surface under gravity and is subjected to the polymerising action of heat, light and/or a catalyst when beneath an adjacent surface heated to a temperature sufficient to prevent condensation of any compound volatilised from the liquid or paste.

It is preferred that said adjacent heated surface is sufficiently close and so shaped that it effectively prevents volatilisation of volatile constituents of said liquid or paste. This surface should also not be heated to a temperature sufficient to cause appreciable evaporation of said volatile constituents. Very satisfactory temperatures to which this surface may be heated are from the boiling point to 20° C. above the boiling point of the highest boiling volatile constituent in said liquid or paste, e. g. 100° C.–120° C. when the volatile constituent of said liquid or paste is methyl methacrylate.

It is further preferred that the space between the liquid or paste and said adjacent heated surface is substantially free from oxygen, as appreciable quantities of oxygen inhibit polymerisation and would make the polymerisation of at least the upper surface of the liquid or paste undesirably slow. This space can be rendered free from oxygen by passing a slow stream of the vapour of a compound containing the group $CH_2=C<$ through this space or a stream of nitrogen saturated with this vapour.

Liquids which may be employed in the process of this invention include monomeric compounds in the liquid state, preferably when at normal atmospheric pressure, partial polymerisation products of monomeric compounds and solutions of soluble polymeric resins in monomeric compounds. The pastes which may be employed include mixtures of liquid monomeric and solid polymeric organic compounds, which are at least partially soluble in the monomeric compound. Monomeric compounds which are gaseous at normal atmospheric pressure, such as vinyl chloride, are not satisfactory for use in this invention because of the costly pressure equipment which would be required to carry out the invention. Monomeric compounds which are in the liquid state at normal atmospheric pressure may contain one $CH_2=S<$ group per molecule, e. g. methyl methacrylate, butyl methacrylate, styrene and vinyl acetate or more than one $CH_2=C<$ group per molecule, e. g. glycol dimethacrylate, allyl methacrylate, diallyl oxalate and the compounds described in British specifications Nos. 11,052/44, 14,249/44, 18,631/45, 19,030/45, 19,-751/45, 148/46, 150/46, 3,258/46, 3,259/46 and 19,582/46. Monomeric compounds which contain more than one $CH_2=C<$ group per molecule when polymerised alone, or in the presence of a compound containing one $CH_2=C<$ group per molecule and which is not an overwhelmingly major component of the mixture, e. g. say not more than 95%, first form viscous liquids, then gels which have only a small solubility in monomers and then insoluble solid polymeric resins. Thus not all partially polymerised or fully polymerised monomeric compounds are suitable for use in this invention, particularly when the monomers contain more than one $CH_2=C<$ group per molecule.

The liquids and pastes for use in this invention may also contain plasticisers such as tricresyl phosphate or dibutyl phthalate; fillers; reinforcing materials such as fabrics; dyes and pigments, providing that these materials do not prevent the polymerisation of the monomeric compounds contained in these mixtures.

As stated polymerisation may be effected by the action of heat, light and/or a catalyst. A polymerisation catalyst will normally be employed. Thus with heat polymerisation the liquids or pastes to be cast will contain small amounts of catalysts such as peroxides, for example benzoyl peroxide, and the azo compounds described in United States patent application Serial Nos. 655,011, now Patent No. 2,500,023, and 655,015, now abandoned, and British patent applications Nos. 7,124/47 and 7,125/47. With photo-polymerisation catalysts such as benzoin and related compounds, and the azo compounds described in United States patent application Serial No. 655,013, now abandoned, and British patent application No. 7,123/47 will normally be employed. Where photo-polymerisation is employed it is of course necessary to instal a suitable source of radiation to activate polymerisation. This may be accomplished by constructing part of the apparatus of transparent solid material such as glass or polymethyl methacrylate through which the radiation is projected onto the liquid or paste to be cast, or by installing suitable sources of radiation within the apparatus. When the process of this invention is used for the production of sheets of polymeric material, particularly when it is designed for continuous operation, the lower surfaces of these sheets may be formed by casting on surfaces of liquids such as mercury or solutions, preferably saturated solutions, of salts in water or on solid surfaces which will not mix with the polymerizing material. The use of liquid casting surfaces has the disadvantage, however, that elaborate precautions are often necessary to prevent them forming ripples. If desired, these lower surfaces may be cast on metal bands, metal bands having the advantage that they can be polished more easily than metal plates as they may be passed through honing and polishing devices without regard being taken to their flatness. If desired, moving metal bands may be used, as described in British specification No. 491,739. It is preferred that these metal bands are kept level by floating them on a liquid maintained under a slight pressure in a trough by continuously forcing some of this liquid from between the edge of the trough and the lower surface of the metal band. In another embodiment the casting may be carried out on the surface of a thin layer of liquid which will not mix with the polymerizing material, such as a salt solution, for example brine, spread on the upper surface of a metal plate or band, either stationary or moving as described above. This embodiment avoids the necessity of polishing the metal surfaces and minimises ripple in the liquid casting surface by virtue of its thinness.

It will be appreciated that when the liquid or paste to be polymerised by the process of this invention is cast upon the surface of a liquid such as mercury or a saturated solution of salt in water or a solid surface, e. g. of a metal band, it is necessary for side walls to form a trough with this surface. When the process is designed for continuous operation and said surface is the surface of a liquid these side walls may consist of the polymerised material, of some means for casting the liquid or paste on the casting surface and of two flexible bands which dip into the liquid and move at the same rate and direction as the polymerising material moves on the surface of the liquid. When, in a continuous process, a metal band, instead of a surface of a liquid, is used as the casting surface, flexible bands which are clipped or clip onto the metal band, to prevent leakage of cast liquid or paste, may be used as the two side walls which move on either side of the liquid or paste. Side walls for clipping onto, or which clip onto, a metal band are preferably shaped so that their surfaces which form an angle with the metal band do not form a sharp angle with this band and therefore do not form traps for dirt and partially polymerised material. Such bands may be produced by the extrusion of rubber, polythene, polyvinylchloride or like compositions.

It will also be appreciated that in the process of this invention when liquid or paste is subjected to polymerising conditions by a continuous process in which side walls move at the same speed and direction as the liquid or paste, in order to avoid friction and vibration, the hereinbefore mentioned adjacent heated surface should not touch said side walls. It is preferred, however, that said adjacent heated surface is close to the upper edges of said side walls and that it has edges which are turned down and on either side of said side walls and, if the liquid or paste is being cast on a liquid casting surface or on a metal band floating on a supporting liquid, preferably dips into said casting or supporting liquid, so that the polymerisation reaction of this process is accomplished in what is effectively a tunnel. Alternatively the heated surface may be integral with or attached to a trough containing the liquid forming the casting surface or supporting the metal band, provided conduction of heat between the heated surface and the material of the trough is not sufficiently great to interfere adversely with the course of the polymerisation reaction. If such conduction of heat is likely to be too great the heated surface and the trough may be separated by insulating material.

When the polymerisation reaction of this invention is substantially complete, articles produced may of course be subjected to such processes as heat treatment to render them form stable, e. g. to remove unpolymerised compound containing the group $CH_2=C<$ by evaporation and/or further polymerisation, and/or to shaping or embossing operations, e. g. shaping operations to produce corrugated sheets.

Figure 2:
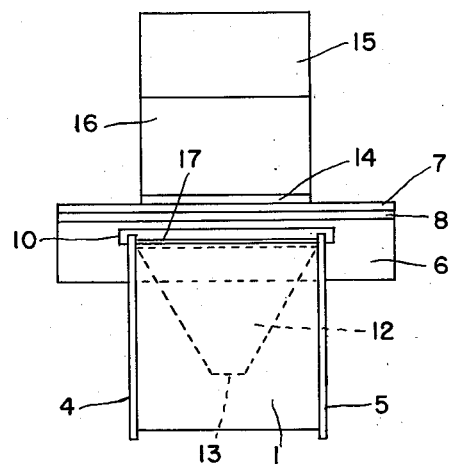
Figure 3:
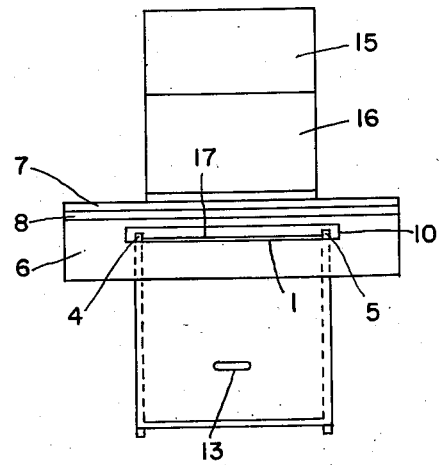

The invention is illustrated but in no way limited by the accompanying drawings, in which:

Figure 1 is a diagrammatic representation of side elevation of one form of apparatus for carrying out the invention, Figure 2 is a diagrammatic representation of an end of elevation of the same apparatus viewed from the right-hand side of Figure 1, and Figure 3 is a section on the line III—III of Figure 1.

As illustrated in the drawings the apparatus includes a continuous flexible metal band 1 supported and driven in the direction indicated by the arrows by drums 2 and 3. Also supported and driven by drums 2 and 3 are gaskets 4 and 5 which may be of rubber or like material.

A hollow chamber is formed by a trough 6 and a cover 7, the trough and cover being separated by a layer of heat-insulating material 8. The hollow chamber so formed has slots 9 and 10, one at each end through which pass the metal band 1 and the gaskets 4 and 5. During its travel through the hollow chamber the metal band 1 is supported on brine which is delivered from a storage tank to trough 6 through pipe 11. The brine passes through trough 6 along with metal band 1 and flows out through slot 10, dropping into a funnel 12 whence it is returned to its storage tank through pipe 13. Some excess brine also flows out through slot 9, is collected in a second funnel (not shown) and returned to its storage tank.

The cover 7 is heated by means of an electrical heater 14 so that its inner surface, that is the surface adjacent the liquid or paste which is to be cast on band 1, is raised to a temperature about 10° C. above the boiling point of the highest boiling volatile constituent of the liquid or paste. For example where methyl methacrylate is the highest boiling volatile constituent a temperature of 110° C. is suitable.

Liquid or paste to be cast is passed from storage tank 15 through conduit 16 which passes into the afore-mentioned hollow chamber through slot 9 and delivers the liquid or paste at such a rate that a substantially constant level thereof is maintained on the band 1 from a point P onwards.

The rate of polymerisation of the polymerisable constituents of the liquid or paste and the rate of movement of the continuous metal band 1 are adjusted so that polymerisation is complete before slot 10 is reached. Sheet polymeric material 17 resulting from the polymerisation is taken off the continuous metal band by means of a suitable conveyor or other means.

Polymerisation will normally be effected by including a suitable polymerisation catalyst in the liquid or paste to be cast and subjecting said liquid or paste to the activating influence of heat and/or light. Heat activation may be accomplished in a variety of ways, including, for example, by heating the liquid passing through trough 6 thus heating the liquid or paste to be cast by conduction through the metal band 1, or by inserting infra-red lamps inside the hollow chamber between the cover 7 and the liquid or paste being cast. In the case of photo-polymerisation suitable sources of radiation may be inserted in the hollow chamber or may be placed outside said chamber, said chamber being provided with transparent windows, for example of glass or polymethyl methacrylate, through which the radiation is projected onto the liquid or paste being cast.

The present invention is further illustrated by the following example which describes the production of sheets of polymethyl methacrylate for which purpose the invention is particularly suited.

Example

The apparatus used was similar to that illustrated diagrammatically in the accompanying drawings.

Drums 2 and 3 each had a diameter of 18 inches, and the distance between the centres of the drums was 9 ft. The flexible metal band 1 was made of steel and was 9 inches wide. The hollow chamber formed by trough 6 and cover 7 extended for a distance of 6 ft. along the band. The inside of the hollow chamber just above the steel band 1 was maintained at a temperature of 55° C. by heating through 6 with low pressure steam passed through suitably located pipes.

In order to ensure easy removal of the sheets of polymethyl methacrylate from the apparatus, the band 1 was covered with a wet film of regenerated cellulose which overlapped both sides of the band and was stuck to the back of the band. The regenerated cellulose was allowed to dry and become taut before operation of the apparatus.

The gaskets 4 and 5 were composed of a flexible plasticised polyvinyl chloride composition, and had a $\tfrac{1}{16}$ inch square cross-section. A length of the same material was fixed across the band 1 between the gaskets 4 and 5 to prevent flow of liquid down the apparatus during the initial stages of the process.

The drums 2 and 3 were set rotating at a rate of 0.225 rev./hour and a viscous syrup containing 100 parts by weight methyl methacrylate, 6 parts by weight polymethyl methacrylate and 0.12 part by weight benzoyl peroxide was continuously fed from storage tank 15 onto the band 1 at a rate of 20.5 cubic inches per hour.

After about 5½ hours operating a sheet of polymethyl methacrylate began to emerge from the slot 10. As the sheet passed drum 3 it was separated from the metal band 1. Sheet 9 inches wide and of any desired length was thus obtained. It was transparent, free from porosity, substantially free from internal strain and of excellent upper surface finish.

We claim:

1. A process for the production of polymeric materials in sheet form having at least one smooth surface which comprises allowing a mass containing at least one liquid compound having the group $CH_2=C<$ to flow so that it forms a smooth upper surface under gravity and is subjected to polymerization promoting means when it is beneath an adjacent surface heated to a temperature sufficient to prevent condensation of any compound volatilized from the mass.

2. A process as set forth in claim 1, wherein the mass subjected to polymerization promoting means when beneath an adjacent surface is heated to a temperature from the boiling point to 20° C. above the boiling point of the highest boiling volatile constituent in said mass.

3. A process as set forth in claim 1, wherein the mass having at least one liquid compound having the group $CH_2=C<$ is in the liquid state at normal atmospheric pressure and temperature.

4. A process as set forth in claim 1, wherein the space between the mass and the adjacent heated surface is substantially free from oxygen.

5. A process as set forth in claim 1, wherein the mass comprises monomeric methylmethacrylate.

6. A process as set forth in claim 1, wherein the mass comprises partially polymerized methylmethacrylate.

7. A process as set forth in claim 1, wherein the heated surface is heated to a temperature from 100° C. to 120° C.

8. A process for the production of polymeric materials in sheet form, wherein a mass containing at least one liquid compound having the group $CH_2=C<$ is allowed to flow on a moving surface which carries said mass through a zone in which it is subjected to polymerization promoting means when beneath an adjacent heated surface heated to a temperature sufficient to prevent condensation of any compound volatilized from the mass.

9. A process as set forth in claim 8, wherein the moving surface is fabricated from metal.

10. A process as set forth in claim 8, wherein the moving surface is a continuous moving surface.

11. A process as set forth in claim 8, wherein the moving surface is the upper surface of a liquid which will not mix with the mass containing at least one liquid compound having the group $CH_2=C<$.

12. A process as set forth in claim 8, wherein the moving surface is supported on a liquid maintained under a slight pressure in a trough by continuously forcing some of the liquid from between the edge of said trough and the lower surface of the moving surface.

13. A process as set forth in claim 8, wherein the mass is supported on the upper surface of a thin layer of a liquid which will not mix with the mass spread on the upper surface of the moving surface which is fabricated from metal.

14. A process as set forth in claim 8, wherein the flow of mass is limited by one or more means on the side of said moving surface.

15. A process as set forth in claim 8, wherein the moving surface and the upper adjacent heated surface are located so as to form a substantially closed chamber in which the compound having the group $CH_2=C<$ are polymerized.

ALEXANDER BURNESS.
EDMOND G. WILLIAMS.

REFERENCES CITED

The following references are of record in the file of this patent:

UNITED STATES PATENTS

| Number | Name | Date |
|---|---|---|
| 2,254,203 | Bender | Sept. 2, 1941 |
| 2,270,182 | Collings et al. | Jan. 13, 1942 |
| 2,283,539 | Collings et al. | May 19, 1942 |
| 2,300,211 | Eberlin | Oct. 27, 1942 |
| 2,345,013 | Soday | Mar. 28, 1944 |
| 2,370,562 | Meunier | Feb. 27, 1945 |
| 2,437,492 | Allen | Mar. 9, 1948 |
| 2,500,728 | Williams | Mar. 14, 1950 |